United States Patent
Cole

(10) Patent No.: US 6,654,523 B1
(45) Date of Patent: Nov. 25, 2003

(54) OPTICAL ALIGNMENT GUIDE AND METHOD FOR ALIGNING AN OPTICAL FIBER ARRAY WITH AN OPTICAL INTEGRATED CIRCUIT

(75) Inventor: Robert Cole, Mt. Hamilton, CA (US)

(73) Assignee: Lightwave Microsystems Corporation, San Jose, CA (US)

( * ) Notice: Subject to any disclaimer, the term of this patent is extended or adjusted under 35 U.S.C. 154(b) by 0 days.

(21) Appl. No.: 09/927,991

(22) Filed: Aug. 10, 2001

(51) Int. Cl.[7] .................................................. G02B 6/12
(52) U.S. Cl. ............................ 385/52; 385/14; 385/50; 385/39
(58) Field of Search ........................ 385/14, 15, 24, 385/27, 31, 32, 39, 48–52, 129–132, 137, 147

(56) References Cited

U.S. PATENT DOCUMENTS

| | | | |
|---|---|---|---|
| 4,778,243 A | 10/1988 | Finzel | 350/96.21 |
| 5,016,972 A | 5/1991 | Schlaak | 350/96.22 |
| 5,559,915 A | 9/1996 | Deveau | 385/49 |
| 5,640,477 A | 6/1997 | Anderson | 385/89 |
| 5,703,973 A | 12/1997 | Mettler et al. | 385/14 |
| 6,118,917 A | 9/2000 | Lee et al. | 385/49 |
| 6,175,675 B1 | 1/2001 | Lee et al. | 385/50 |

FOREIGN PATENT DOCUMENTS

| | | | | |
|---|---|---|---|---|
| JP | 06281825 A | * | 10/1994 | G02B/6/12 |
| JP | 10123373 A | * | 5/1998 | G02B/6/42 |
| JP | 10227934 A | * | 8/1998 | G02B/6/122 |

* cited by examiner

Primary Examiner—Hemang Sanghavi
Assistant Examiner—Scott Knauss
(74) Attorney, Agent, or Firm—Amin & Turocy, LLP

(57) ABSTRACT

Optical circuits are disclosed having one or more alignment guides for aligning the circuits with optical fiber arrays. The alignment guides have loop type optical paths extending between first and second ends, which are positioned in a fixed location relative to waveguides in the optical circuit allowing alignment of an optical fiber array with the circuit using a light source and a light detector connected to the array. In addition, methods and systems are disclosed for aligning optical fiber arrays with waveguides in an optical circuit.

33 Claims, 10 Drawing Sheets

US 6,654,523 B1

OPTICAL ALIGNMENT GUIDE AND METHOD FOR ALIGNING AN OPTICAL FIBER ARRAY WITH AN OPTICAL INTEGRATED CIRCUIT

TECHNICAL FIELD

The present invention relates to the art of optical integrated circuits and more particularly to apparatus and methods for aligning optical fiber arrays with optical integrated circuits.

BACKGROUND OF THE INVENTION

Optical integrated circuits (OICs) include devices such as 1×N optical splitters, optical switches, wavelength division multiplexers (WDMs), and the like, which are used in a variety of applications. For instance, traditional signal exchanges within telecommunications networks and data communications networks using transmission of electrical signals via electrically conductive lines are being replaced with optical fibers and circuits through which optical (e.g., light) signals are transmitted. Such optical circuits may have a planar structure, commonly known as planar lightwave circuits (PLCs), in which one or more optical circuits in the OIC can be used for routing optical signals from one of a number of parallel input optical fibers to any one of a number of parallel output optical fibers.

The input and output optical fibers are typically formed in a group or array of many such fibers (e.g., 48), where the fiber array is connected to a planar substrate (e.g., an integrated circuit chip) to transmit or receive light to or from waveguides in the optical circuit. Light from the optical fibers is then provided to optical circuitry via the waveguides, wherein the optical circuitry may include switches, multiplexers, modulators, or other optical circuitry. The waveguides comprise optical paths deposited on the chip, which are made from glass or other transmissive media such as optical polymers, wherein the waveguides have a higher index of refraction than the chip substrate in order to guide light to or from the optical fibers in the array. The waveguide ends are commonly formed on a sidewall of the optical circuit, whereat the optical fiber ends may be connected with the waveguides. The connection of optical fibers to the optical integrated circuit is sometimes referred to as "pigtailing", where an optical fiber array attached to the optical circuit appears as a pigtail.

In the pigtailing process, the ends of the optical fibers in the array must be aligned with the ends of the waveguides in the OIC, in order to ensure proper transmission of light therebetween. Conventional techniques for such alignment have included one at a time alignment and attachment of individual optical fibers, which is time consuming and not ideally suited for higher volume production of pigtailed devices. Other conventional techniques employ V-grooves etched in the substrate, in which the optical fibers may be placed for lateral alignment with the waveguides. However, inaccuracies in the lithographic and etching processes limit the applications of alignment by this methodology.

Active alignment techniques include monitoring the optical transmission of the connection visually or observing the relative positions of the waveguide cores while moving the optical fibers relative to the planar waveguides. Such transmission monitoring can be performed using a light source providing light to one or more fiber ends, and a light detector. It has been found that such active alignment procedures typically produce lower loss interconnections, but result in a higher cost per interconnection than passive alignment techniques. For example, one or more dedicated waveguides may be provided in an optical integrated circuit for providing light from an input array directly to an output array. Corresponding input and output array fibers are connected to a light source and a light detector, and the input and output arrays are moved relative to the OIC until light from the light source (e.g., at the input array) is detected (e.g., at the output array), thereby indicating proper alignment of both the input and output fibers.

An example of a conventional OIC alignment system 2 is illustrated in FIG. 1, for aligning input and output optical fiber arrays 4 and 6 to an optical integrated circuit 8. The OIC 8 includes dedicated alignment waveguides 20 and 22 at the outermost ends of the waveguide rows providing optical paths between the outermost fibers of the arrays 4 and 6. The alignment system 2 further includes light sources 40 and 44 providing light to the input fibers 30 and 34, respectively, of the array 4, as well as and light detectors 42 and 46 receiving light from the output array fibers 32 and 36, respectively. As can be seen in FIG. 1, the system 2 suffers from several drawbacks, which render the technique expensive and/or impractical in a manufacturing setting. One such drawback, is that the input fiber array 4 must be aligned in order to verify the output array alignment, while at the same time, the output array 6 must be aligned to verify alignment of the input array.

Another variant includes connecting the light source 40 to a fiber (e.g., fiber 30) in input array 4 and moving the array 4 relative to the OIC 8 while manufacturing personnel manually view the output end of the dedicated waveguide 20 (e.g., without the output array 6) to determine when light is transmitted, thereby indicating alignment of the input fiber 30 with the dedicated waveguide 20. Thereafter, a fiber 32 in the output array 6 is connected to light detector 42, and is moved until light is detected, thus indicating alignment of the output array fiber 32 with the dedicated waveguide 20. This process is time consuming and requires human intervention, which is impractical in high volume manufacturing environments. Thus, there remains a need for apparatus and methodologies by which fiber array pigtailing may be performed in an expeditious automated fashion.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter. The present invention provides optical circuits with optical alignment guides and methods for alignment of optical fiber arrays with optical circuits by which the above mentioned and other problems may be overcome or mitigated.

One aspect of the invention provides an optical integrated circuit (OIC) comprising a loop around optical alignment guide located in a fixed position relative to an input or an output end of the OIC, wherein the alignment guide has first and second ends facing in the same direction and operative to interface with first and second optical fibers, with an optical path between the first and second ends. The alignment guide can loop light from one fiber in an array back to another fiber in the same array, thereby facilitating alignment of an individual array with the OIC independent of alignment (e.g., or the presence) of another array.

Thus, for example, an input fiber array can be aligned and pigtailed to an OIC independently from alignment of an output array to the OIC. In addition, the alignment guide allows expeditious alignment and attachment of such arrays (e.g., pigtailing) without human intervention, thereby facilitating automated pigtailing operations in a manufacturing setting. More than one such loop type alignment guide can be provided in an OIC, for example, whereby alignment guides are positioned at the ends of rows of input and/or output active waveguides.

Another aspect of the invention provides methodologies for aligning an optical fiber array with at least one waveguide in an optical integrated circuit. The methods comprise providing an optical alignment guide in the optical integrated circuit having an optical path extending between its first and second ends, the first and second ends of the optical alignment guide being located in a fixed position relative to the waveguide, providing light to a first end of a first optical fiber in the array, and detecting light from a first end of a second optical fiber in the array, and positioning the array such that light is detected at the first end of the second optical fiber.

In addition, a second optical alignment guide may be provided in the optical integrated circuit having an optical path extending between its first and second ends, the first and second ends of the second optical alignment guide being located in a second fixed position relative to at least one waveguide. In this variant, the method may comprise providing light to a first end of a third optical fiber in the array, and detecting light from a first end of a fourth optical fiber in the array, and positioning the array such that light is detected at the first ends of the second and fourth optical fibers. Yet another aspect of the invention relates to making an optical integrated circuit by providing one or more loop around alignment guides with ends facing the same direction and an optical path therebetween.

Yet another aspect of the invention provides systems for aligning an optical fiber array with an optical integrated circuit, comprising the optical integrated circuit containing an optical alignment guide having an optical path extending between first and second ends, wherein the first and second ends face the same direction and are located in a fixed position relative to at least one waveguide; the optical fiber array comprising a first optical fiber having a first and second ends and a second optical fiber having a first and second ends, and a third optical fiber having a first and second ends; a light source for directing light into the first end of the first optical fiber; and a light detector for detecting light from the first end of the second optical fiber.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
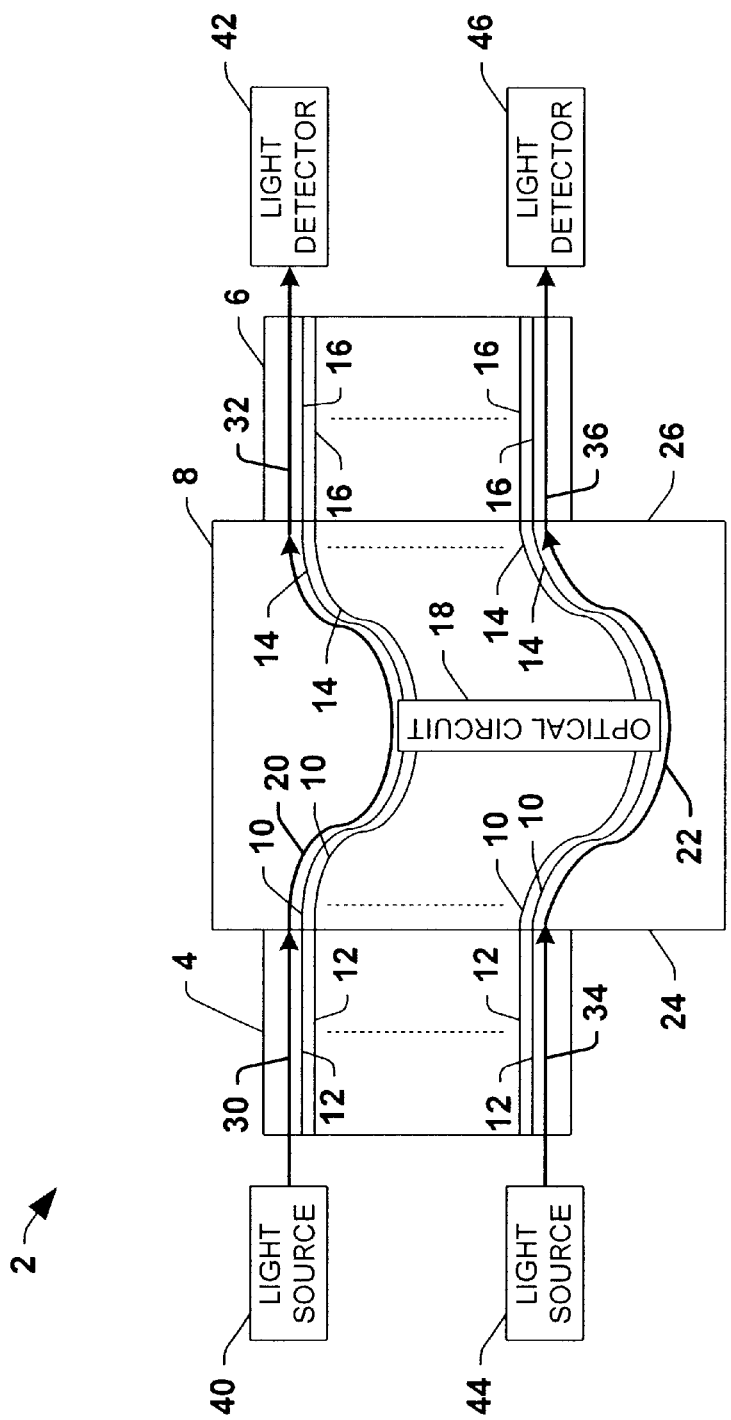
FIG. 1 is a schematic top plan view illustrating a conventional optical integrated circuit alignment system.

The various aspects of the present invention will now be described with reference to the drawings, wherein like reference numerals are used to refer to like elements throughout. The invention provides an optical circuit comprising one or more loop type alignment guides useful for aligning and pigtailing optical fiber arrays to optical integrated circuits such as PLCs. The invention allows individual fiber arrays to be pigtailed to such optical integrated circuits independently, and can be advantageously employed in automated pigtailing in a manufacturing facility to provide efficient and cost effective alignment of optical fiber arrays to optical integrated circuits.

In order to illustrate various shortcomings associated with prior pigtailing techniques, FIG. 1 shows a conventional optical circuit alignment system 2 for aligning input and output optical fiber arrays 4 and 6, respectively, with waveguides in an optical integrated circuit (OIC) 8. The OIC 8 includes a plurality of input waveguides 10 with input ends operative to interface with optical fibers 12 in the input fiber array 4 when aligned therewith, as well as output waveguides 14 having output ends operative to interface with optical fibers 16 in the output fiber array 6. The OIC 8 further includes an optical circuit 18, such as a switching or multiplexing circuit, which may perform one or more functions relating to receiving light from the input waveguides 10 and providing light to the output waveguides 14.

Dedicated first and second alignment waveguides 20 and 22, respectively, are also provided at the outermost ends of the waveguide rows at the input and output sides 24 and 26, respectively, of the OIC 8. The alignment waveguide 20 provides an optical path between the outermost fibers 30 and 32 of the arrays 4 and 6, respectively, and the alignment waveguide 22 provides an optical path between the outermost fibers 34 and 36 of the arrays 4 and 6, respectively. The alignment system 2 further includes light sources 40 and 44 operatively connected to provide light to the input fibers 30 and 34, respectively, of the array 4, as well as light detectors 42 and 46 receiving light from the output array fibers 32 and 36, respectively.

As can be seen in FIG. 1, proper alignment of both the input and output arrays 4 and 6 with the OIC 8 provides a circuitous optical path from the light source 40 to the detector 42 via input fiber 30, dedicated waveguide 20 and output fiber 32, allowing the detector 42 to detect light from the source 40. Thus, the detector 42 indicates that the dedicated waveguide 20 is operationally aligned with the input fiber 30 at the input side 24 of the OIC 8, and also with the output fiber 32 at the output side 26. However, should the dedicated waveguide 20 be misaligned with either of the fibers 30 or 32, the detector 42 detects no light from the source 40.

Similarly, proper alignment of both the input and output arrays 4 and 6 with the OIC 8 provides a path from the light source 44 to the detector 46 via input fiber 34, dedicated waveguide 22 and output fiber 36, allowing the detector 46 to detect light from the source 44. The detector 46 can thus indicate that the dedicated waveguide 22 is simultaneously aligned with the input fiber 34 at the input side 24 of the OIC 8, and also with the output fiber 36 at the output side 26. If the dedicated waveguide 22 is misaligned with either of the fibers 34 or 36, the detector 46 detects no light from the source 44. As can be appreciated from FIG. 1, the system 2 is difficult and/or impractical to effectively automate in a high volume manufacturing environment, due to the inherent dependency between the alignment of both the input and output arrays 4 and 6 with the OIC 8, in order to employ the detectors 42 and/or 46.

Figure 2:
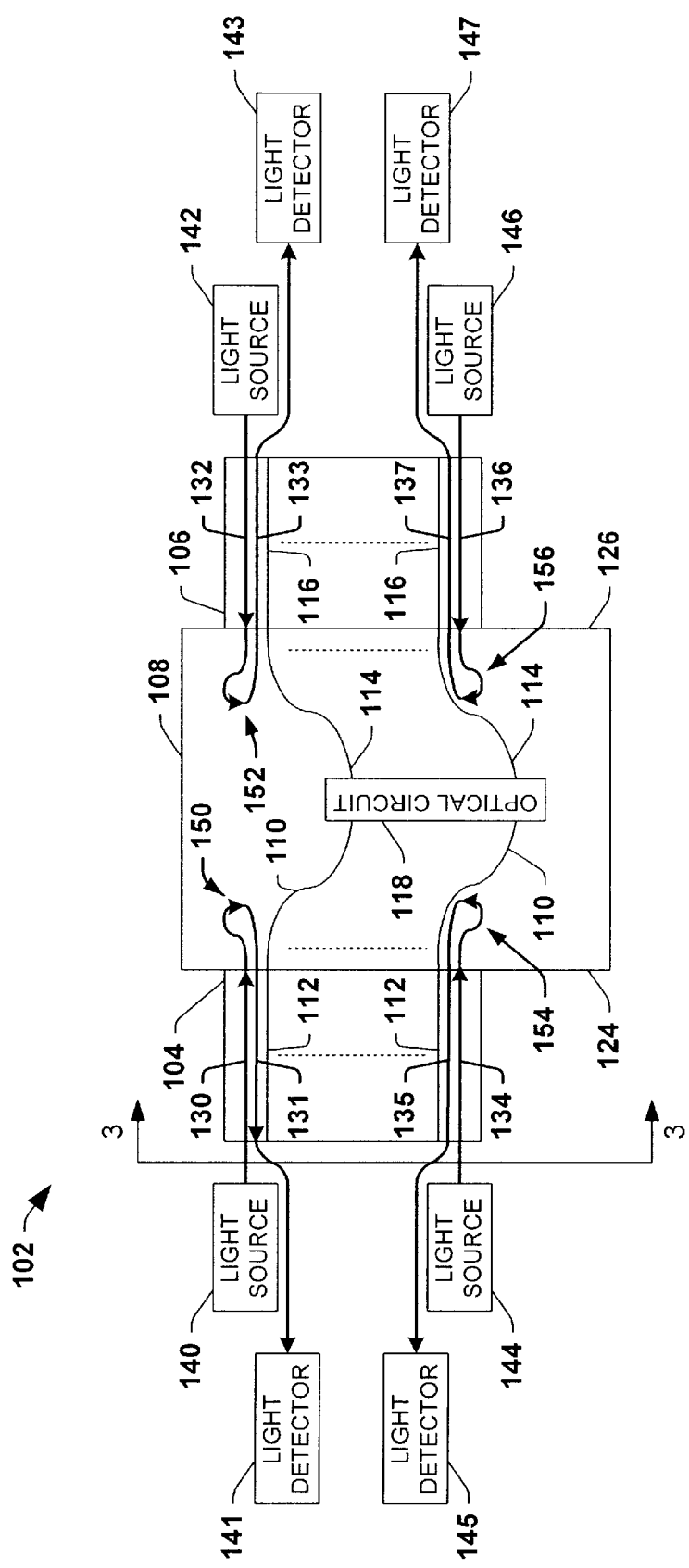
FIG. 2 is a schematic top plan view illustrating an exemplary optical integrated circuit having optical alignment guides for aligning input and output optical fiber arrays with the optical integrated circuit in accordance with an aspect of the present invention.

The present invention provides optical alignment guides for such OICs, which can eliminate or mitigate such dependency between the alignment of multiple optical fiber arrays. Referring now to FIG. 2, one implementation of the invention is illustrated in a system 102 for aligning input and output optical fiber arrays 104 and 106, respectively, with waveguides in an OIC 108, which can be a planar lightwave circuit (PLC) or other type of optical circuit or device. The OIC 108 includes a plurality of active input waveguides 110 with input ends operative to interface with optical fibers 112 in the input fiber array 104 when aligned therewith, as well as active output waveguides 114 having output ends operative to interface with optical fibers 116 in the output fiber array 106.

The OIC 108 further includes an optical circuit 118 receiving light from the input waveguides 110 and providing light to the output waveguides 114. The optical circuit 118 can be any type of optical circuit, for example, such as a modulating, switching, or multiplexing circuit. Although the OIC 108 is illustrated with input and output waveguides 110 and 114 being active to interface light to or from the fiber arrays 4 and 6, respectively, it will be appreciated that one or more such waveguides 110 and/or 114 may be inactive or unused. For example, the input and output fiber arrays 104 and 106 may comprise 48 optical fibers, wherein less than all of the fibers (e.g., 40) may be actively employed in providing light to or from the OIC 108, with the remaining fibers and waveguides associated therewith being inactive.

According to one aspect of the invention, the exemplary OIC 108 also comprises optical alignment guides or loops 150 and 154 located in fixed positions at the outermost ends of the row of active input waveguides 110 at an input side 124 of the OIC 108. The alignment guides 150 and 154 each comprise first ends operative to interface with first optical fibers 130 and 134, and second ends facing the same direction in order to interface with second fibers 131 and 135, respectively, of the input array 104. The guides 150 and 154 individually comprise an optical path or loop between the first and second ends, such that light entering into one of the ends is provided to the other end. For instance, the optical path of the alignment guide or loop 150 can comprise an optical path or loop deposited on the substrate of the OIC 108 chip, such as can be made from glass or other transmissive media such as optical polymers, $SiO_2$, or the like, having a higher index of refraction than the chip substrate in order to guide light to or from the optical fibers 130 and 131 in the array 104. Thus, light from a light source 140 is transmitted through the fiber 130, the alignment guide or loop 150, and the fiber 131 when the guide 150 is properly aligned with the fibers 130 and 131, whereby a light detector 141 can be connected to the fiber 131 to indicate such alignment.

In similar fashion, light from a light source 144 is transmitted through the fiber 134, the alignment guide 154, and the fiber 135 when the guide 154 is properly aligned with the fibers 134 and 135, whereby a light detector 145 can be connected to the fiber 135 to indicate such alignment. The exemplary OIC 108 further comprises optical alignment guides 152 and 156 for alignment of the output optical fiber array 106 with waveguides 116 in an output side 126 of the OIC 108. The alignment guide 152 comprises first and second ends to interface with fibers 132 and 133, respectively, of the output array 106, as well as an optical path therebetween. When the ends of the alignment guide 152 are properly aligned with the fibers 132 and 133, light from a light source 142 travels through the fiber 132, the alignment guide 152, and the fiber 133, to a light detector 143. Likewise, the alignment guide 156 comprises first and second ends to interface with fibers 136 and 137, respectively, of the output array 106, as well as an optical path therebetween. When the ends of the alignment guide 156 are properly aligned with the fibers 136 and 137, light from a light source 146 travels through the fiber 136, the alignment guide 156, and the fiber 137, to a light detector 147.

Figure 3:
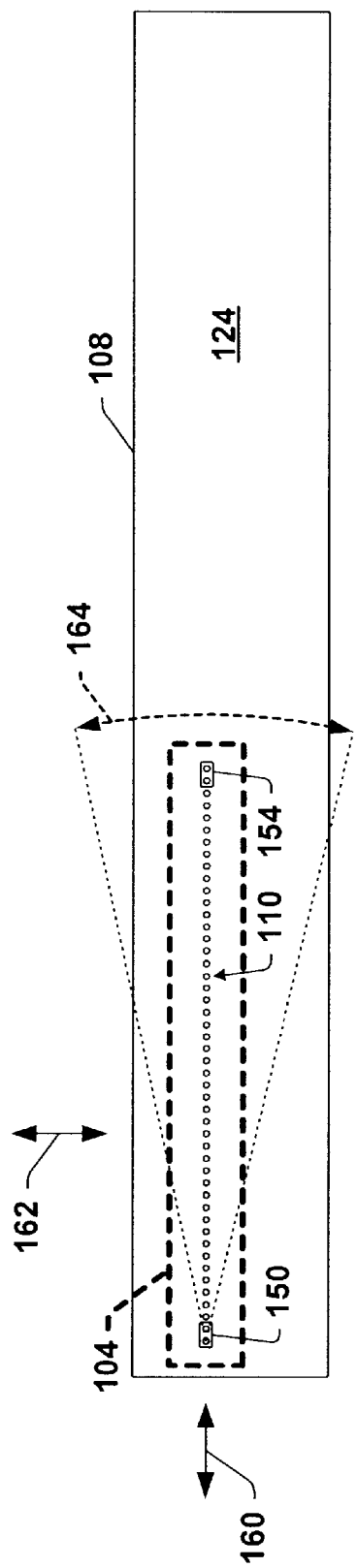
FIG. 3 is a schematic side elevation view taken along line 3—3 of FIG. 2, illustrating alignment of an optical fiber array with an optical integrated circuit.
Figure 4:
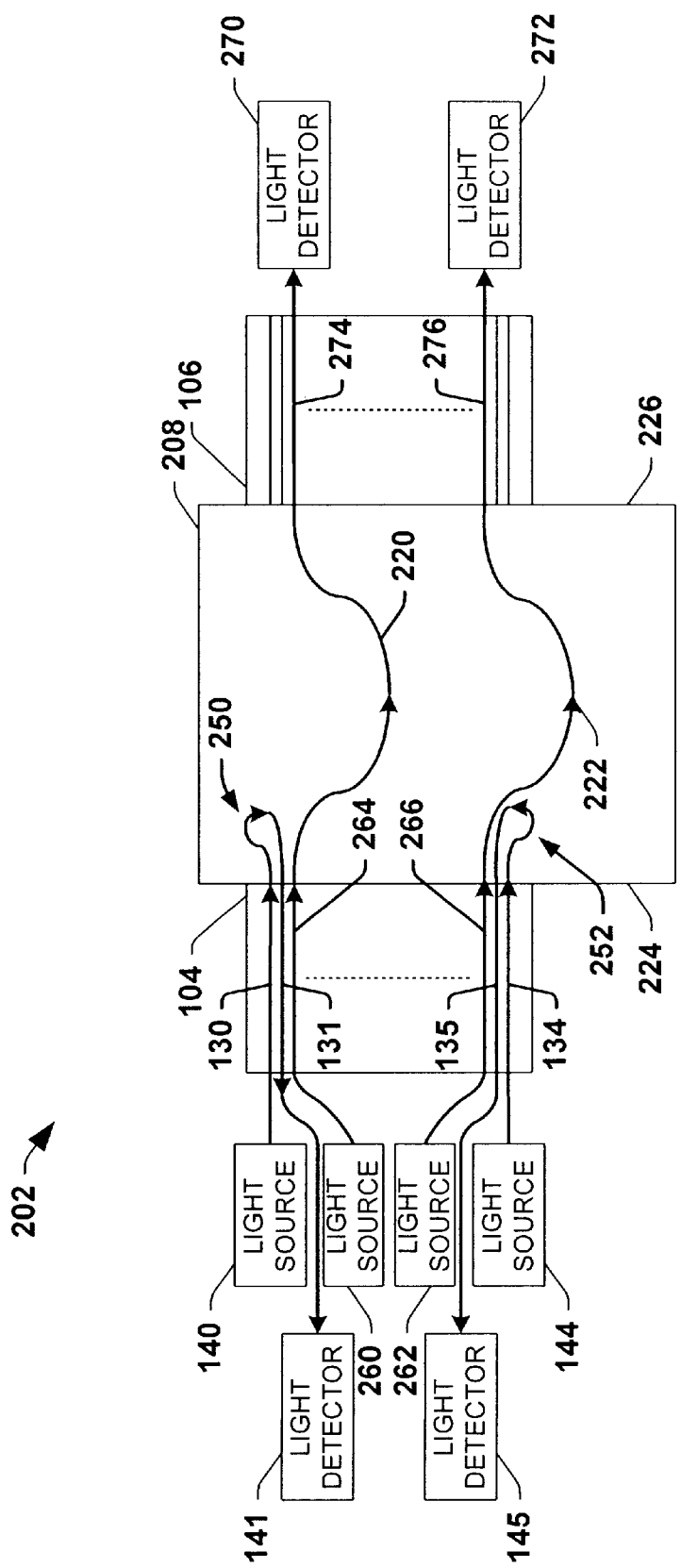
FIG. 4 is a schematic top plan view illustrating another exemplary optical integrated circuit having optical alignment guides for aligning an input fiber array with the optical integrated circuit according to the invention.

Referring also to FIG. 3, the alignment guides 150 and 154 can advantageously be employed for expedited alignment of the input fiber array 104 with the waveguides 110 on the input side 124 of the OIC 108. For example, the array 104 can be connected to light source 140 and detector 141 via fibers 130 and 131, and moved in the X direction 160 and Y direction 162 relative to the OIC 108 until the detector 141 detects light, thereby indicating alignment of the fibers 130 and 131 with the first and second ends of the alignment guide 150. Thereafter, alignment may generally be assumed close in the lateral or X direction 160, and angular adjustment in the direction 164 may be made until the light detector 145 senses light from the light source 144 through fibers 134, 135, and alignment guide 154.

Due to the proximity of the first and second ends of an alignment guide 150 for example to each other (such as typically about 400 microns or less and more typically about 250 microns or less), and an allowable offset from fiber to waveguide of about 2 microns or less, an angular misalignment of up to about 0.5° of the fiber array 104 to the OIC 108

(for example, where the first fiber in the array is perfectly aligned to the first waveguide, but the last fiber is offset) permits light to be detected despite the misalignment. Maintaining parallelism of alignment equipment to within about 0.5° is generally achievable, thereby allowing for straighfforeward implementation of an automated alignment search algorithm.

Once such light is detected, alignment of the input fiber array 104 with the OIC 108 can be assumed close, after which further adjustments can be made in the X, Y, and/or angular directions 160, 162, and 164, respectively, in order to further refine alignment prior to attachment of the array 104 to the input side 124 of the OIC 108. In addition to alignment for attachment (e.g., pigtailing), the invention can be advantageously employed to align the array 104 with the OIC 108 for testing purposes, for example, wherein the array 104 is not permanently attached to the OIC, but rather temporarily aligned therewith during testing. It will be appreciated that the OIC 108 may further comprise a generally horizontal ledge (not shown) or other abutment surface with which the array 104 may be engaged during alignment, for example, whereby vertical alignment in the Y direction 162 and angular alignment in the direction 164 can be presumed close. In this regard, coarse alignment may comprise merely translating the array 104 in the X direction 160 until light is detected in both detectors 141 and 145, after which fine adjustment may be undertaken (e.g., in one or more of the directions 160, 162, and/or 164) in order to maximize the detected light at detectors 141 and 145.

Other alignment procedures may be employed in accordance with the invention, apart from those described above, wherein one or both of the optical alignment guides 150 and 154 are employed to align the array 104 with the OIC 108. Referring briefly back to FIG. 1, it will be noted that whereas the conventional alignment system 2 suffers from the dependency of simultaneous alignment of both input and output arrays 4 and 6 with the OIC 8, the present invention overcomes such dependency, thereby facilitating automation of the alignment and pigtailing process. Thus, as illustrated in FIGS. 2 and 3, the alignment and attachment of the input fiber array 104 with the OIC 108 can be performed independently of the alignment (e.g., and/or of the presence) of an output array 106. It will also be appreciated that the provision of one or both of the output alignment guides 152 and 156 at the output side 126 of the OIC 108 allows the alignment and attachment of the output fiber array 106 regardless of whether an input array (e.g., array 104) is aligned or even present.

Other configurations of such alignment guides are contemplated within the scope of the present invention, some examples of which are illustrated and described hereinafter with respect to FIGS. 4–8. As illustrated in the system 202 of FIG. 4, an OIC 208 may be provided with a combination of loop type alignment guides 250 and 252, for example, on an input side 224 of the OIC 208, in combination with dedicated alignment waveguides 220 and 222 for alignment of the output array 106 with waveguides on an output side 226 of the OIC 208. In this example, the alignment guides 250 and/or 252 can be used to align and attach the input array 104. Subsequently, the alignment waveguides 220 and 222 can be employed to align the output array 106 using light sources 260 and 262 connected to the waveguides 220 and 222 via input fibers 264 and 266, respectively, in the array 104. Alignment of the output array 106 can then be verified using light detectors 270 and 272 via output array fibers 274 and 276, respectively.

Figure 5:
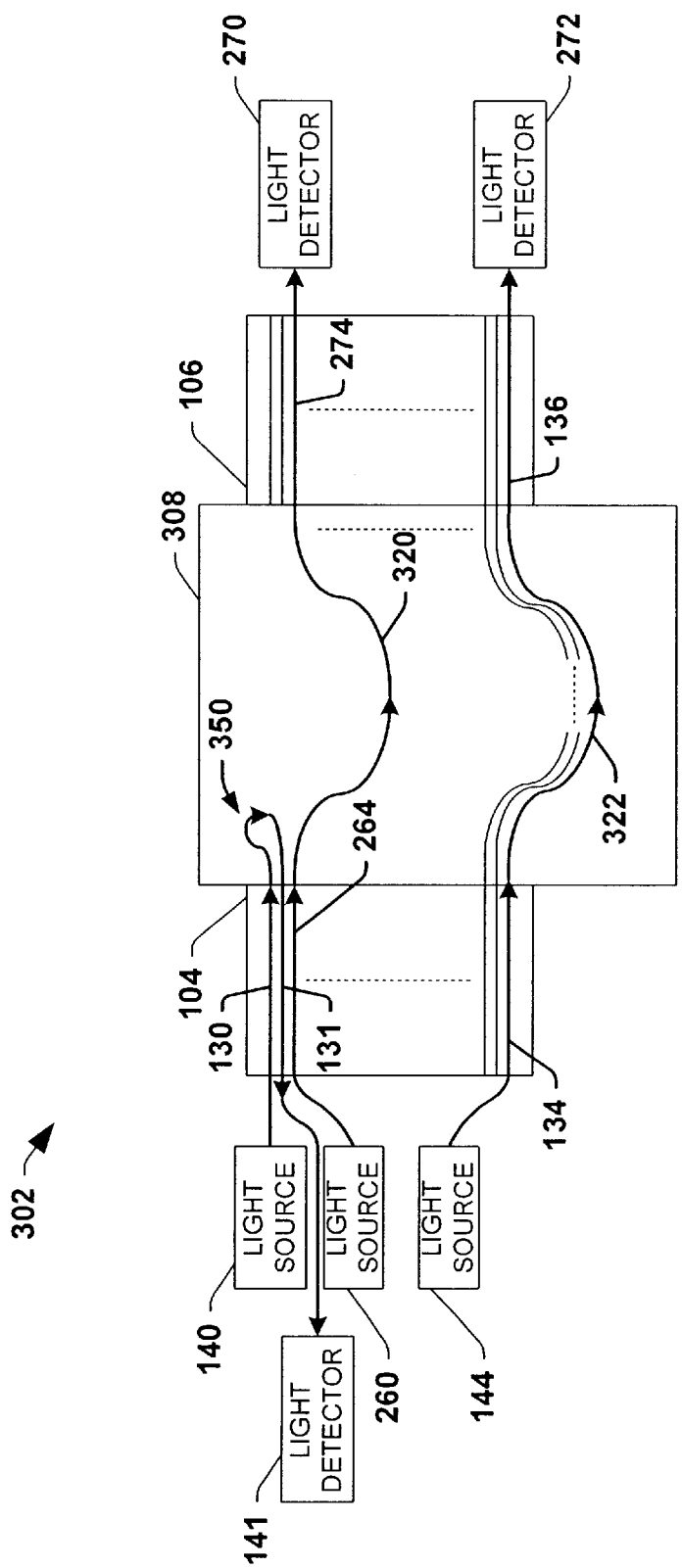
FIG. 5 is a schematic top plan view illustrating another exemplary optical integrated circuit having an optical alignment guide for aligning an input fiber array with the optical integrated circuit according to the invention.

Another exemplary alignment system 302 is illustrated in FIG. 5, in which an OIC 308 comprises a loop type alignment guide 350 having first and second ends for interfacing with input fibers 130 and 131 of input array 106 for alignment of the array 106 using light source 140 and detector 141 as described above. The OIC 308 further includes dedicated alignment waveguides 320 and 322 for interfacing with input fibers 264 and 134 of the input array 104, and fibers 274 and 136, respectively, of the output array 106. The light source 140 and detector 141 can be employed (e.g., alone or in combination with mechanical alignment features, not shown) in order to align the input array 104, after which light sources 260 and 144 can be used with waveguides 320 and 322 and light detectors 270 and 272, respectively, in order to align the output array 106.

Figure 6:
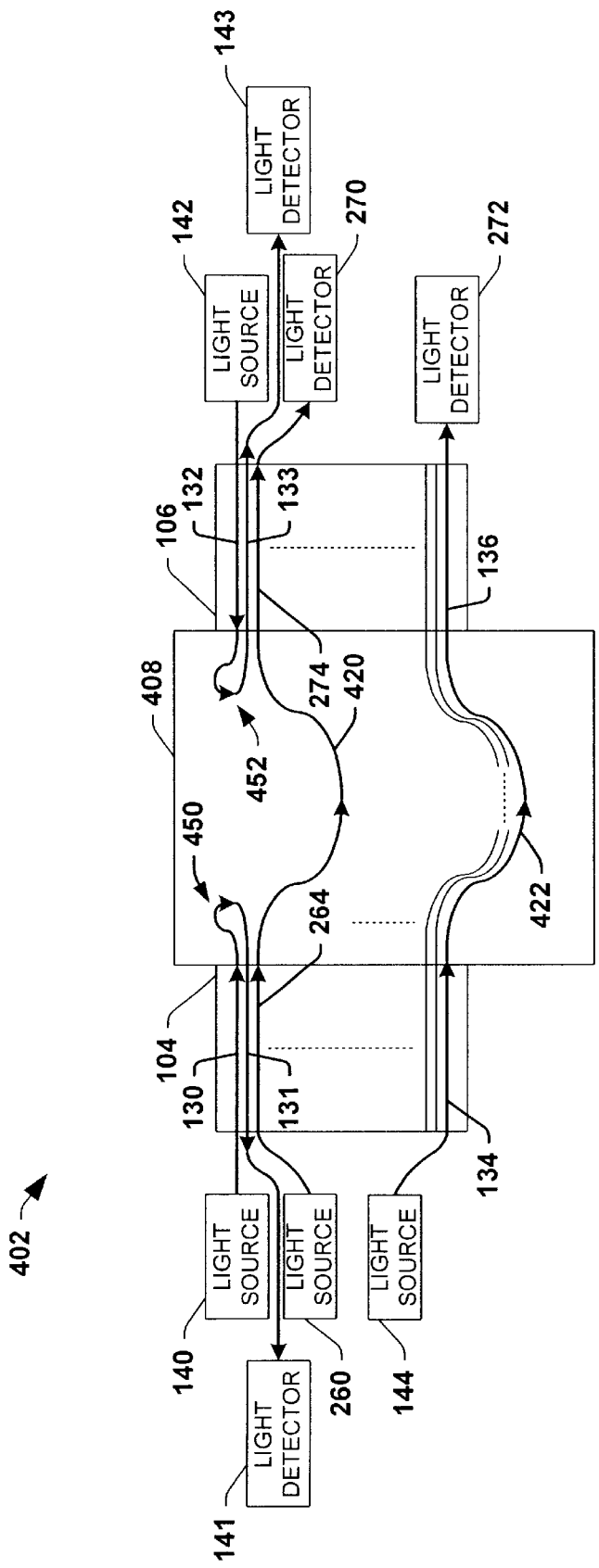
FIG. 6 is a schematic top plan view illustrating another exemplary optical integrated circuit having optical alignment guides for aligning input and output fiber arrays with the optical integrated circuit according to the invention.

Referring now to FIG. 6, another exemplary alignment system 402 includes an OIC 408 with loop type alignment guides 450 and 452 located for alignment of input and output arrays 104 and 106, respectively. The OIC 408 can alternatively or in combination comprise alignment waveguides 420 and/or 422 for further alignment using light sources 260 and 144 and light detectors 270 and 272. Although the loop type alignment guides illustrated and described above are located near one or both of the outermost ends of the OIC waveguide rows, other positioning of the alignment guides is contemplated as falling within the scope of the present invention.

Figure 7:
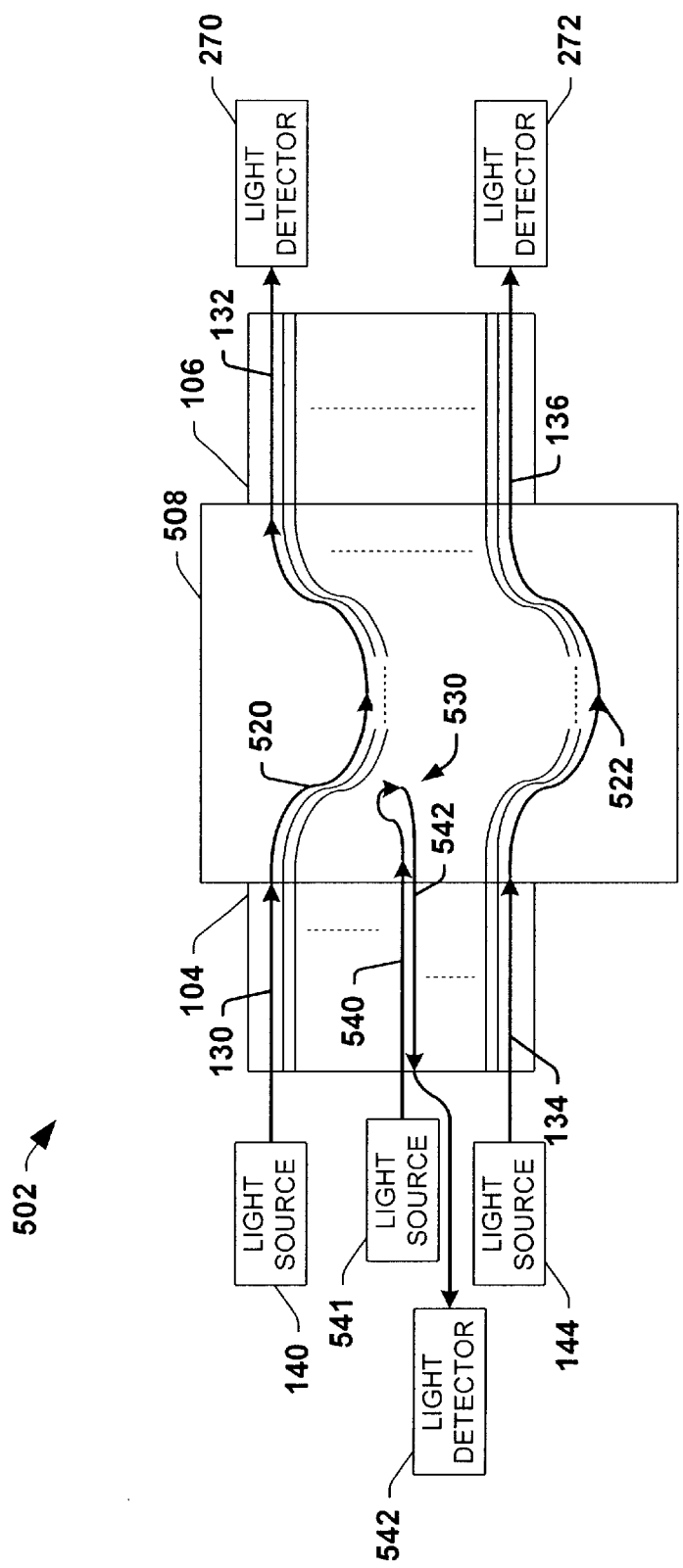
FIG. 7 is a schematic top plan view of another exemplary optical integrated circuit having an optical alignment guide for aligning an input fiber array with the optical integrated circuit according to the invention.

For example, another system 502 is illustrated in FIG. 7, having an OIC 508 with a single loop back alignment guide 530 providing an optical path between first and second ends operative to interface with fibers 540 and 542 of the input fiber array 104. The alignment guide 530, a light source 541 and a light detector 542 can thus be employed alone or together with waveguides 520 and 522 to align the array 104 with the OIC 508, after which the waveguides 520 and 522 can be used to align the output array 106. It will be appreciated in this regard that the loop type alignment guides can be positioned at the outermost ends of the rows of waveguides, or in any fixed position relative to the waveguides in accordance with the present invention. An alternative orientation involves replacing the waveguide loop 530 with a mirror, so that light from the first end of the alignment guide is reflected back to the second end.

Figure 8:
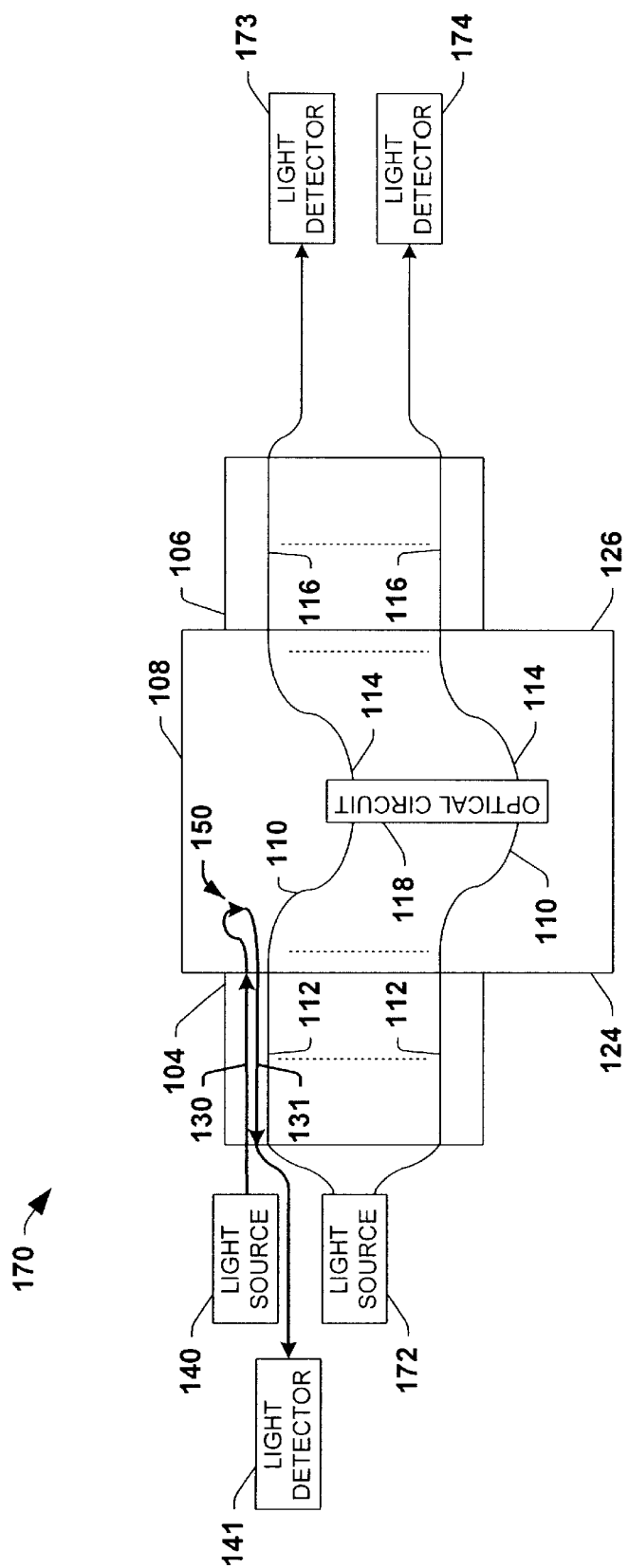
FIG. 8 is a schematic top plan view of yet another exemplary optical integrated circuit having an optical alignment guide for aligning an input fiber array with the optical integrated circuit according to the invention.

Referring now to FIG. 8, another exemplary alignment system is illustrated in a system 170 for aligning input and output optical fiber arrays 104 and 106, respectively, with waveguides in an OIC 108, which can be a PLC or other type of optical circuit or device. The OIC 108 includes a plurality of active input waveguides 110 with input ends operative to interface with optical fibers 112 in the input fiber array 104 when aligned therewith, as well as active output waveguides 114 having output ends operative to interface with optical fibers 116 in the output fiber array 106.

The OIC 108 further includes an optical circuit 118 receiving light from the input waveguides 110 and providing light to the output waveguides 114. The optical circuit 118 can be any type of optical circuit, for example, such as a modulating, switching, or multiplexing circuit. Although the OIC 108 is illustrated with input and output waveguides 110 and 114 being active to interface light to or from the fiber arrays, it will be appreciated that one or more such waveguides 110 and/or 114 may be inactive or unused. For example, the input and output fiber arrays may comprise 48 optical fibers, wherein less than all of the fibers (e.g., 40) may be actively employed in providing light to or from the OIC 108, with the remaining fibers and waveguides associated therewith being inactive.

According to one aspect of the invention, the exemplary OIC 108 also comprises optical alignment guide or loop 150 located in a fixed position at the outermost end of the row of active input waveguides 110 at an input side 124 of the OIC 108. The alignment guide 150 comprises a first end operative to interface with first optical fiber 130, and a second end facing the same direction in order to interface with second fiber 131 of the input array 104. The guide 150 comprises an optical path or loop between the first and second ends, such that light entering into one of the ends is provided to the other end. For instance, the optical path of the alignment guide or loop 150 can comprise an optical path or loop deposited on the substrate of the OIC 108 chip, such as can be made from glass or other transmissive media such as optical polymers, $SiO_2$, or the like, having a higher index of refraction than the chip substrate in order to guide light to or from the optical fibers 130 and 131 in the array 104. Thus, light from a light source 140 is transmitted through the fiber 130, the alignment guide or loop 150, and the fiber 131 when the guide 150 is properly aligned with the fibers 130 and 131, whereby a light detector 141 can be connected to the fiber 131 to indicate such alignment.

Broadband light from a light source 172 is transmitted through discrete fibers 112 (typically at or near the end of the arrays), through discrete input waveguides 110, through optical circuit 118, through discrete output waveguides 114, through discrete fibers 116, where it is detected by light detectors 173 and 174, connected to the fibers 116 to facilitate alignment of output fiber arrays 106.

Figure 9:
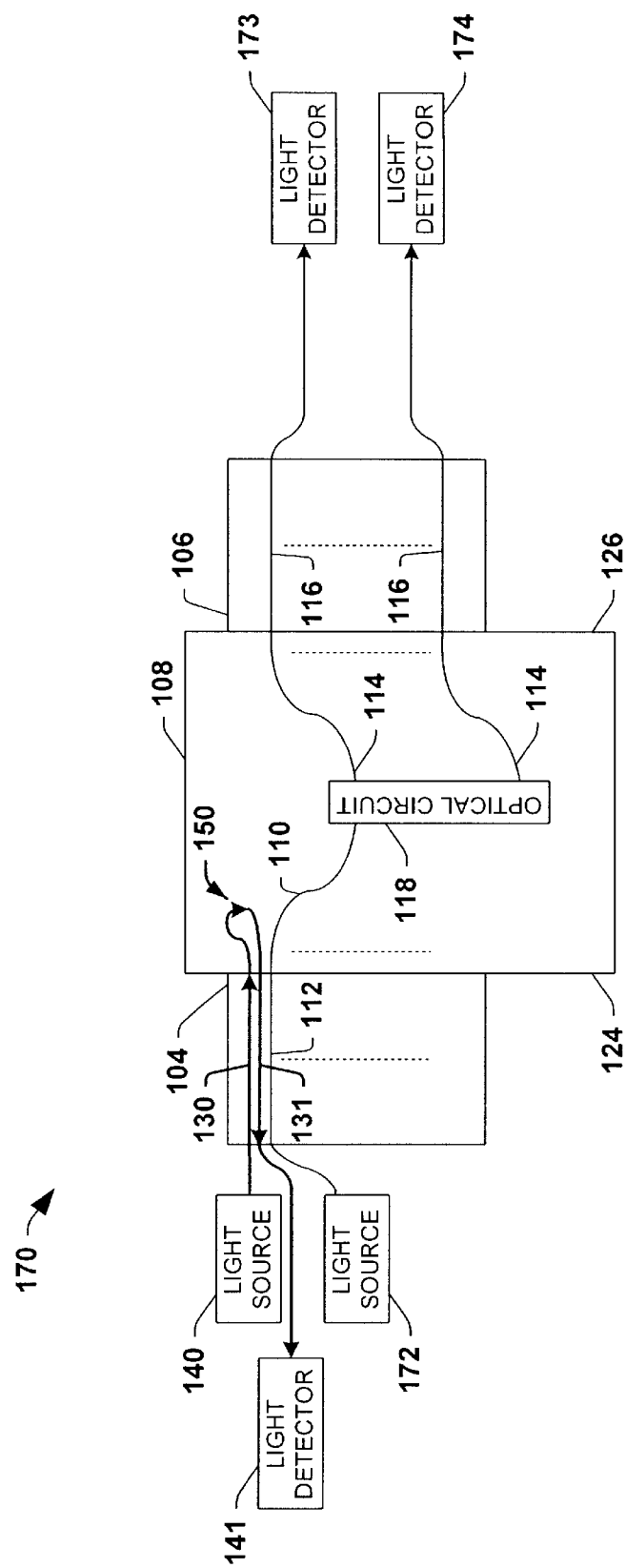
FIG. 9 is a schematic top plan view of still yet another exemplary optical integrated circuit having an optical alignment guide for aligning an input fiber array with the optical integrated circuit according to the invention.
Figure 10:
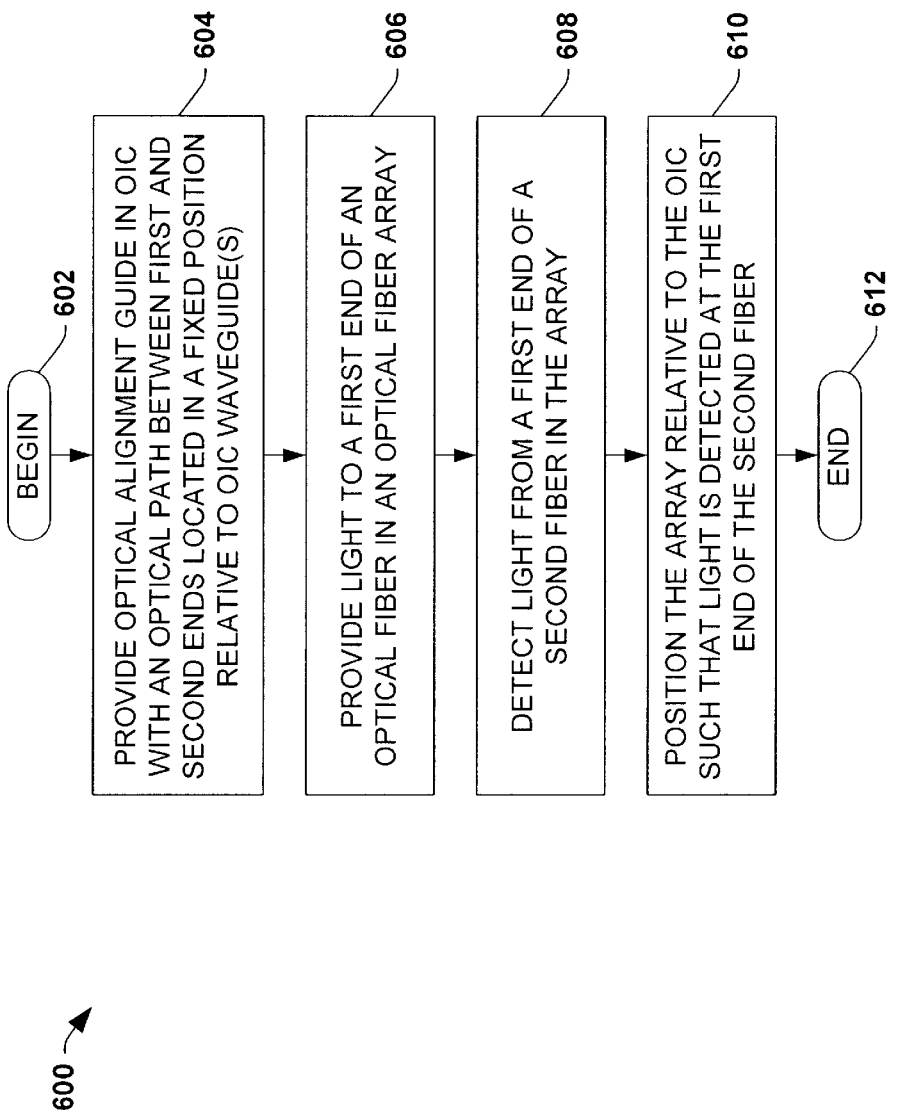
FIG. 10 is a flow diagram illustrating an exemplary method of aligning an optical fiber array with waveguides in an optical integrated circuit in accordance with another aspect of the invention.

Referring now to FIG. 9, yet another exemplary alignment system is illustrated in a system 170 for aligning input and output optical fiber arrays 104 and 106, respectively, with waveguides in an OIC 108, which can be a PLC or other type of optical circuit or device. The OIC 108 includes one active input waveguide 110 with an input end operative to interface with an optical fiber 112 in the input fiber array 104 when aligned therewith, as well as active output waveguides 114 having output ends operative to interface with optical fibers 116 in the output fiber array 106.

The OIC 108 further includes an optical circuit 118 receiving light from the input waveguides 110 and providing light to the output waveguides 114. The optical circuit 118 can be any type of optical circuit, for example, a demultiplexing circuit. Although the OIC 108 is illustrated with output waveguides 114 being active to interface light to a fiber array, it will be appreciated that one or more such waveguides 114 may be inactive or unused. For example, the output fiber array may comprise 48 optical fibers, wherein less than all of the fibers (e.g., 40) may be actively employed in providing light from the OIC 108, with the remaining fibers and waveguides associated therewith being inactive.

According to one aspect of the invention, the exemplary OIC 108 also comprises optical alignment guide or loop 150 located in a fixed position near the active input waveguide 110 at an input side 124 of the OIC 108. In some embodiments, especially embodiments where the OIC contains one input waveguide, the optical alignment guide or loop 150 is located within about 400 microns of the active input waveguide 110, and often with about 250 microns of the active input waveguide 110.

The alignment guide 150 comprises a first end operative to interface with first optical fiber 130, and a second end facing the same direction in order to interface with second fiber 131 of the input array 104. The guide 150 comprises an optical path or loop between the first and second ends, such that light entering into one of the ends is provided to the other end. For instance, the optical path of the alignment guide or loop 150 can comprise an optical path or loop deposited on the substrate of the OIC 108 chip, such as can be made from glass or other transmissive media such as optical polymers, $SiO_2$, or the like, having a higher index of refraction than the chip substrate in order to guide light to or from the optical fibers 130 and 131 in the array 104. Thus, light from a light source 140 is transmitted through the fiber 130, the alignment guide or loop 150, and the fiber 131 when the guide 150 is properly aligned with the fibers 130 and 131, whereby a light detector 141 can be connected to the fiber 131 to indicate such alignment.

Broadband light from a light source 172 is transmitted through fiber 112, through input waveguide 110, through optical circuit 118, through discrete output waveguides 114, through discrete fibers 116, where it is detected by light detectors 173 and 174, connected to the fibers 116 to facilitate alignment of output fiber arrays 106.

In this embodiment where an OIC 108 contains a single input waveguide 110 (e.g., the optical circuit 118 is a demultiplexer), the method to align specifically involves putting a light source on first optical fiber 130, and search for light on second optical fiber 131, as the array 104 is moved relative to the. OIC 108. When the light is maximized through second optical fiber 131, and with the input fiber array 104 close to parallel to the OIC 108, the input fiber 112 for the optical circuit is roughly aligned, in close enough alignment to the input waveguide 110 to allow adequate transmission of light throughout the optical circuit 108 to allow for alignment of the output fiber array 106.

At this point, a light source 172 is connected to the single input fiber 112. In the case of a demultiplexer optical circuit 118, broadband light is used, in order to provide light at all or many of the output waveguides 114, as each output waveguide 114 allows for passage of a discrete, individual frequency.

The output fiber array 106, with light detectors 173 and 174 connected at one or more outer active fibers 116 (two fibers in this case; or fibers near them), is then aligned to maximize the power on the two output light detectors 173 and 174, using standard techniques.

The input fiber alignment is then optimized, by moving the input fiber 112 with respect to the OIC 108, while monitoring the power on the two output light detectors 173 and 174 to again maximize the power on the two output light detectors 173 and 174, using standard techniques.

Another aspect of the invention provides methodologies for aligning optical fiber arrays with optical circuits. One such method 600 is illustrated in FIG. 9 in accordance with the invention. Although the exemplary method 600 is illustrated and described herein as a series of blocks representative of various events and/or acts, the present invention is not limited by the illustrated ordering of such blocks. For instance, some acts or events can occur in different orders and/or concurrently with other acts or events, apart from the ordering illustrated herein, in accordance with the invention. Moreover, not all illustrated blocks, events, or acts, may be required to implement a methodology in accordance with the present invention. In addition, it will be appreciated that the exemplary method 600 and other methods according to the invention can be implemented in association with the apparatus and systems illustrated and described herein, as well as in association with other systems and apparatus not illustrated or described.

Beginning at 602, an optical alignment guide is provided at 604 in an optical integrated circuit (OIC), where the guide has an optical path between first and second ends, which are located in a fixed position relative to waveguides in the OIC.

At 606, light is provided to one end of an optical fiber in an array, and light is detected at a first end of a second fiber in the array at 608, such as by connecting a light detector to the first end of the second fiber. Thereafter at 610, the array is positioned relative to the OIC such that light is maximized at the first end of the second fiber, for instance, wherein the detection of such light indicates alignment of the array with the OIC. The method thus provides for alignment of an array independent from other arrays, which can be automated to provide for speedy alignment and pigtailing in a manufacturing environment. The method 600 may further comprise further adjustment of the alignment, for example, in order to maximize or improve the amplitude of the detected light at the detector. Alternatively or in combination, the methods of the present invention may comprise detection of transmitted light through a plurality of such alignment guides.

Although the invention has been shown and described with respect to certain illustrated implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. Furthermore, to the extent that the terms "includes", "including", with, "has", "having", and variants thereof are used in either the detailed description or the claims, these terms are intended to be inclusive in a manner similar to the term "comprising."

What is claimed is:

1. An optical integrated circuit connectable to a fiber array, the optical integrated circuit comprising:

at least one active waveguide having an end operative to interface with an optical fiber from the fiber array; and at least one optical alignment guide located in a fixed position relative to the active waveguide, wherein the optical alignment guide comprises first and second ends facing the same direction and operative to interface with first and second optical fibers in the fiber array, and an optical path between the first and second ends, a plurality of active waveguides having ends, the ends of the waveguides are configured in a row, and wherein at least one optical alignment guide is located proximate an end of the row;

first and second optical alignment guides located proximate opposite ends of the input waveguide row and form a part thereof; and third and fourth optical alignment guides located proximate opposite ends of an output waveguide row and form a part thereof.

2. The optical integrated circuit of claim 1, wherein the first and second ends of at least one optical alignment guide are adjacent one another.

3. The optical integrated circuit of claim 1, wherein the first and second ends of at least one optical alignment guide are adjacent one another in the row.

4. The optical integrated circuit of claim 3, wherein the first and second ends of at least one optical alignment guide are in the row at an outer most end thereof.

5. The optical integrated circuit of claim 1, wherein the optical path of at least one optical alignment guide forms an optical loop between the first and second ends of the optical alignment guide.

6. The optical integrated circuit of claim 1, comprising a first optical alignment guide, a second optical alignment guide, a third optical alignment guide, and a fourth optical alignment guide, wherein the first, second, third, and fourth optical alignment guides comprise first and second ends facing the same direction and operative to interface with optical fibers in first and second fiber arrays and to provide an optical path between the first and second ends.

7. The optical integrated circuit of claim 6, wherein the first and second optical alignment guides are located proximate an input waveguide in the optical integrated circuit, and wherein the third and fourth optical alignment guides are located proximate an output waveguide in the optical integrated circuit.

8. The optical integrated circuit of claim 1, wherein the first and second ends of at least one alignment waveguide are within about 400 microns of each other.

9. The optical integrated circuit of claim 1, wherein one of the first and second ends of at least one alignment waveguide are within about 400 microns of at least one active waveguide.

10. An optical integrated circuit for interconnecting first and second fiber arrays, the optical integrated circuit comprising:

a plurality of waveguides individually having input and output ends operative to interface with optical fibers from the first and second fiber arrays, respectively; and at least one alignment loop with an optical path extending in the optical integrated circuit between first and second ends facing the same direction and providing light entering one of the first and second ends to the other of the first and second ends, wherein the first and second ends are located in a fixed position relative to at least one of the plurality of waveguides.

11. The optical integrated circuit of claim 10, wherein input ends of input waveguides are located on a first side of the optical circuit, output ends of output waveguides are located on a second side of the optical circuit, and wherein the first and second alignment loop ends are located on the first side in a fixed position relative to the input ends.

12. The optical integrated circuit of claim 11, wherein input ends of the input waveguides are configured in a row, and wherein the first and second alignment loop ends are located in the row.

13. The optical integrated circuit of claim 12, wherein the first and second alignment loop ends are located at an end of the row.

14. The optical integrated circuit of claim 13, comprising a second alignment loop with an optical path extending in the optical integrated circuit between first and second ends facing the same direction and providing light entering one of the first and second ends to the other of the first and second ends, wherein the first and second alignment loops are located at opposite ends of the row.

15. The optical integrated circuit of claim 14, wherein the output ends of the output waveguides are located in an output row on the second side, and wherein the optical integrated circuit comprises third and fourth alignment loops located at opposite ends of the output row in fixed positions relative to the output ends of the output waveguides.

16. A method of aligning an optical fiber array with an optical integrated circuit, comprising:

providing an optical alignment guide in the optical integrated circuit having an optical path extending between first and second ends, wherein the first and second ends face the same direction and are located in a fixed position relative to at least one waveguide;

providing light to a first end of a first optical fiber in the optical fiber array, and detecting light from a first end of a second optical fiber in the optical fiber array;

positioning the optical fiber array such that light is detected at the first end of the second optical fiber;

providing light to a first end of a third optical fiber in the optical fiber array, and detecting light from a first end of a first optical fiber in a second optical fiber array; and positioning the second optical fiber array such that light is detected at the first end of the first optical fiber of the second optical fiber array.

17. A system for aligning an optical fiber array with an optical integrated circuit, comprising:

the optical integrated circuit comprising an optical alignment guide having an optical path extending between first and second ends, wherein the first and second ends face the same direction and are located in a fixed position relative to at least one waveguide;

the optical fiber array comprising a first optical fiber having a first and second ends and a second optical fiber having a first and second ends, and a third optical fiber having a first and second ends;

a light source for directing light into the first end of the first optical fiber; and a light detector for detecting light from the first end of the second optical fiber, wherein the optical integrated circuit comprises at least two optical alignment guides, each having an optical path extending between first and second ends.

18. The system of claim 17, wherein the optical integrated circuit comprises at least one input waveguide and at least one output waveguide, a first optical alignment guide having an optical path extending between first and second ends, wherein the first and second ends face the same direction and are located in a fixed position relative to the input waveguide and a second optical alignment guide having an optical path extending between first and second ends, wherein the first and second ends face the same direction and are located in a fixed position relative to the output waveguide;

a first optical fiber array comprising a first optical fiber having a first and second ends and a second optical fiber having a first and second ends, and a third optical fiber having a first and second ends;

a second optical fiber array comprising a first optical fiber having a first and second ends and a second optical fiber having a first and second ends, and a third optical fiber having a first and second ends;

a first light source for directing light into the first end of the first optical fiber of the first array; a first light detector for detecting light from the first end of the second optical fiber of the first array;

a second light source for directing light into the first end of the first optical fiber of the second array; and a second light detector for detecting light from the first end of the second optical fiber of the second array.

19. The system of claim 17, wherein the first and second ends of at least one alignment waveguide are within about 400 microns of each other.

20. The system of claim 17, wherein one of the first and second ends of at least one alignment waveguide are within about 400 microns of at least one active waveguide.

21. The system of claim 17, wherein the optical integrated circuit comprises a plurality of active waveguides having ends, the ends of the waveguides are configured in a row, and wherein the at least one optical alignment guide is located proximate an end of the row.

22. The system of claim 17, wherein the first and second ends of at least one of the optical alignment guides are adjacent one another.

23. The system of claim 17, wherein the optical integrated circuit comprises one selected from the group of a demultipixer, a multiplexer, a modulator, and a switcher.

24. The system of claim 17, wherein the optical integrated circuit comprises a first optical alignment guide having an optical path extending between first and second ends, wherein the first and second ends face the same direction and are located in a fixed position relative to a first waveguide and a second optical alignment guide having an optical path extending between first and second ends, wherein the first and second ends face the same direction and are located in a fixed position relative to a second waveguide.

25. The system of claim 24, comprising a first optical fiber array comprising a first optical fiber having a first and second ends and a second optical fiber having a first and second ends, and a third optical fiber having a first and second ends;

a second optical fiber array comprising a first optical fiber having a first and second ends and a second optical fiber having a first and second ends, and a third optical fiber having a first and second ends;

a first light source for directing light into the first end of the first optical fiber of the first array;

a first light detector for detecting light from the first end of the second optical fiber of the first array;

a second light source for directing light into the first end of the first optical fiber of the second array; and a second light detector for detecting light from the first end of the second optical fiber of the second array.

26. The system of claim 24, the optical fiber array comprising a first optical fiber having a first and second ends and a second optical fiber having a first and second ends, a third optical fiber having a first and second ends, a fourth optical fiber having a first and second ends, a fifth optical fiber having a first and second ends, and a sixth optical fiber having a first and second ends;

the system comprising:

a first light source for directing light into the first end of the first optical fiber of the optical fiber array;

a first light detector for detecting light from the first end of the second optical fiber of the optical fiber array;

a second light source for directing light into the first end of the third optical fiber of the optical fiber array; and a second light detector for detecting light from the first end of the fourth optical fiber of the optical fiber array.

27. The system of claim 17, comprising a second optical fiber array comprising a first optical fiber having a first and second ends;
   a second light source for directing light into the first end of the third optical fiber of the optical fiber array; and
   a second light detector for detecting light from the first end of the first optical fiber of the second optical fiber array.

28. The system of claim 27, comprising a second optical fiber array comprising a second optical fiber having a first and second ends; and a third light detector for detecting light from the first end of the second optical fiber of the second optical fiber array.

29. An optical integrated circuit connectable to a fiber array, the optical integrated circuit comprising:
   at least one active waveguide having an end operative to interface with an optical fiber from the fiber array; and
   at least one optical alignment guide located in a fixed position relative to the active waveguide, wherein the optical alignment guide comprises first and second ends facing the same direction and operative to interface with first and second optical fibers in the fiber array, and an optical path between the first and second ends,
   a plurality of active waveguides having ends, the ends of the waveguides are configured in a row, and wherein at least one optical alignment guide is located proximate an end of the row;
   first and second optical alignment guides proximate opposite ends of the row, wherein the first and second optical alignment guides individually comprise first and second ends facing the same direction and operative to interface with optical fibers, and an optical path between the first and second ends.

30. The optical integrated circuit of claim 29, wherein one of the first and second ends of at least one alignment waveguide are within about 400 microns of at least one active waveguide.

31. A method of aligning an optical fiber array with an optical integrated circuit, comprising:
   providing an optical alignment guide in the optical integrated circuit having an optical path extending between first and second ends, wherein the first and second ends face the same direction and are located in a fixed position relative to at least one waveguide;
   providing light to a first end of a first optical fiber in the optical fiber array, and detecting light from a first end of a second optical fiber in the optical fiber array;
   positioning the optical fiber array such that light is detected at the first end of the second optical fiber;
   providing a second optical alignment guide in the optical integrated circuit having an optical path extending between first and second ends, wherein the first and second ends face the same direction and are located in a second fixed position relative to at least one waveguide;
   providing light to a first end of a third optical fiber in the optical fiber array, and detecting light from a first end of a fourth optical fiber in the optical fiber array; and
   positioning the optical fiber array such that light is detected at the first ends of the second and fourth optical fibers.

32. A system for aligning an optical fiber array with an optical integrated circuit, comprising:
   the optical integrated circuit comprising an optical alignment guide having an optical path extending between first and second ends, wherein the first and second ends face the same direction and are located in a fixed position relative to at least one waveguide;
   a first optical fiber array comprising a first optical fiber having a first and second ends and a second optical fiber having a first and second ends, and a third optical fiber having a first and second ends;
   a second optical fiber array comprising a first optical fiber having a first and second ends;
   a light source for directing light into the first end of the first optical fiber and for directing light into the first end of the third optical fiber of the optical fiber array;
   a light detector for detecting light from the first end of the second optical fiber and for detecting light from the first end of the first optical fiber of the second optical fiber array.

33. The system of claim 32, comprising a second optical fiber array comprising a second optical fiber having a first and second ends; and a third light detector for detecting light from the first end of the second optical fiber of the second optical fiber array.

* * * * *